J. G. GERRISH.
SUPPORTING DEVICE FOR AUTOMOBILE JACKS.
APPLICATION FILED DEC. 30, 1914.
1,179,623.
Patented Apr. 18, 1916.
2 SHEETS—SHEET 1.
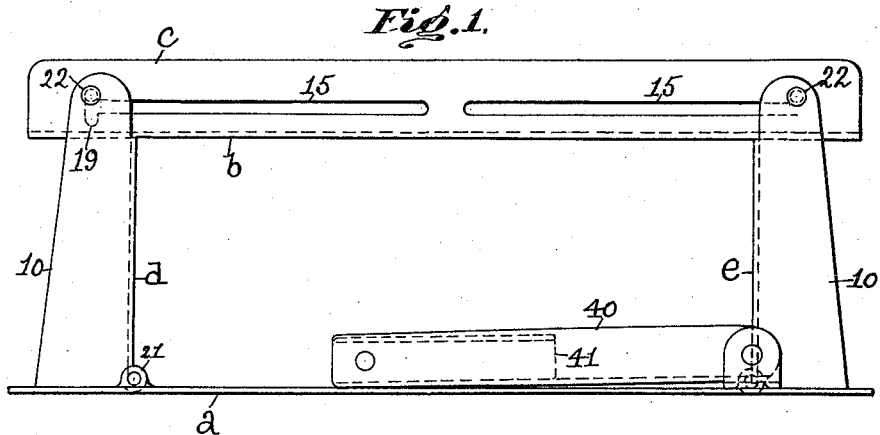
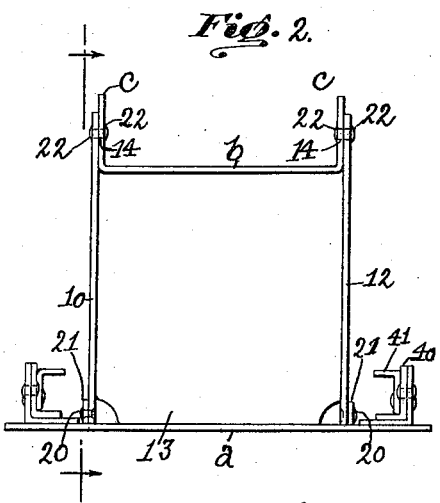
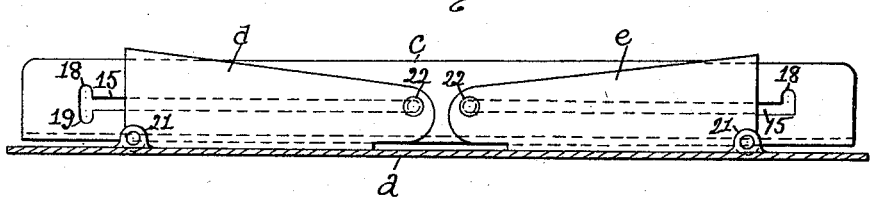
Witnesses:
Inventor
John G. Gerrish
by Jas. H. Churchill
Atty.

J. G. GERRISH.
SUPPORTING DEVICE FOR AUTOMOBILE JACKS.
APPLICATION FILED DEC. 30, 1914.
1,179,623.
Patented Apr. 18, 1916.
2 SHEETS—SHEET 2.
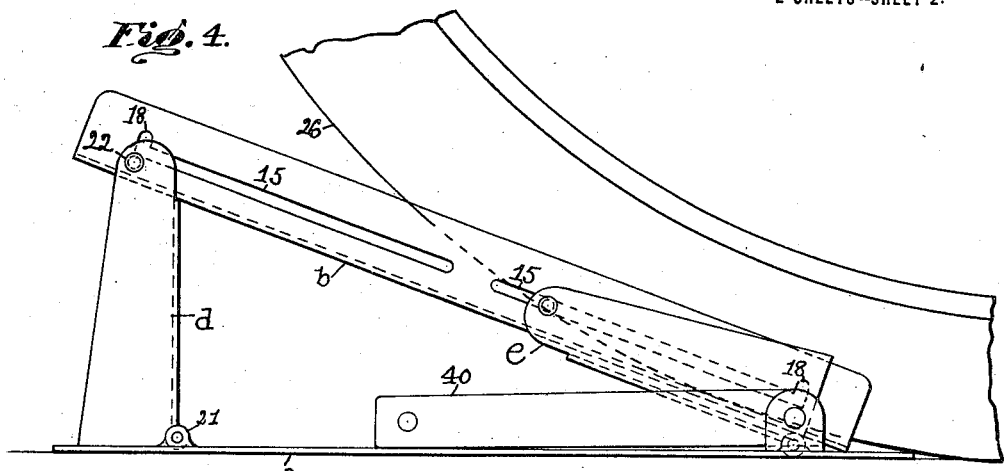
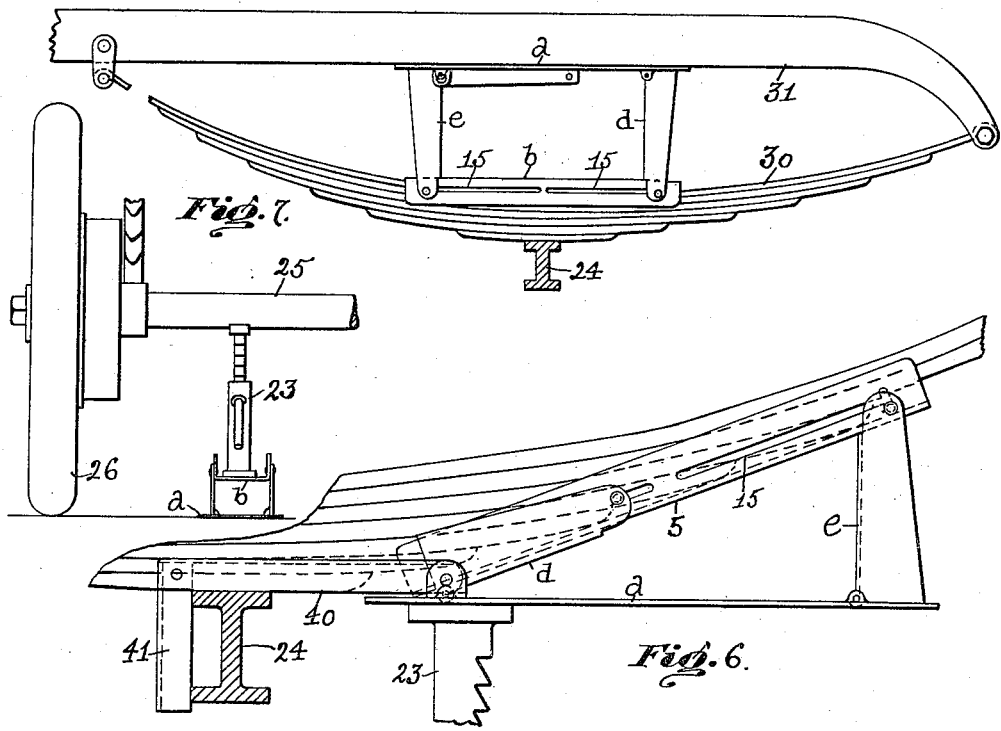
Witnesses:
Ernest A. Telfer
J. Murphy
Inventor
John G. Gerrish
By Jas. H. Churchill
Atty.

UNITED STATES PATENT OFFICE.

JOHN G. GERRISH, OF BROOKLINE, MASSACHUSETTS.

SUPPORTING DEVICE FOR AUTOMOBILE-JACKS.

1,179,623.  Specification of Letters Patent.  Patented Apr. 18, 1916.

Application filed December 30, 1914. Serial No. 879,788.

*To all whom it may concern:*

Be it known that I, JOHN G. GERRISH, a citizen of the United States, residing in Brookline, in the county of Norfolk and State of Massachusetts, have invented an Improvement in Supporting Devices for Automobile-Jacks, of which the following description, in connection with the accompanying drawings, is a specification, like characters on the drawings representing like parts.

This invention relates to a novel supporting device, especially designed and adapted among other uses to be employed as a rest or supporting base for automobile jacks, whereby a firm and substantially broad bearing for the jack is obtained, which is especially useful on soft spots in the road, when the jack is used to permit the tire or shoe to be removed for repair or renewal in case of a puncture or blow-out.

The invention further has for its object to provide a supporting device, which is capable of supporting the jack in close proximity to the ground, or in an elevated position above the ground, for purposes as will be described. To this end, the supporting device is provided with a lower member and with an upper member, which latter is capable of being raised into an elevated position above the lower member by means of supporting members, as will be described. Provision is also made for permitting said upper member to be placed in an inclined position with relation to the lower member. Provision may and preferably will be made for attaching the lower member to the axle of the car, for a purpose as will be described.

These and other features of this invention will be pointed out in the claims at the end of this specification.

Figure 1 is a side elevation of the supporting device in its raised position. Fig. 2, an end elevation of the device shown in Fig. 1. Fig. 3, a side elevation of the device in its lowered position. Fig. 4, a side elevation of the device in position to chock the wheel of an automobile. Fig. 5, a side elevation of the device interposed between the spring and the chassis. Fig. 6, a side elevation showing the device attached to the front axle, and Fig. 7, a rear elevation of a portion of the rear axle of an automobile with a jack resting on the device.

Referring to the drawings, $a$ represents the lower member and $b$ the upper member of a supporting device embodying this invention. The member $a$ may and preferably will be made as a flat sheet metal plate, preferably of steel and oblong in form, and the member $b$ may and preferably will be made as a sheet metal plate having upright flanges $c$ at its opposite sides, which impart to the member $b$ the form of a trough. The member $b$ is designed to normally rest upon the member $a$ as represented in Fig. 3, and to be supported above the member $a$ as represented in Figs. 1 and 2, and for this purpose the member $a$ has pivoted to it members $d$, $e$, for supporting the opposite ends of the member $b$ in the elevated position of the latter. The end-supporting members $d$, $e$ may and preferably will be made of sheet metal, and each consists of side arms or uprights 10, 12, which are connected by a back plate 13. The side arms 10, 12 extend beyond the back plate 13 and carry pins or projections 14, to enter slots 15 extended longitudinally in the side flanges of the upper member, and thereby support the upper member from the lower member. Each side flange $c$ of the upper member may be provided with a continuous slot extended from near one end to near the other end of said flange, or as is preferred, each side member may be provided with two slots 15, which extend from near the center of the said flange toward its opposite ends. The longitudinal slots 15 may and preferably will communicate at their outer ends with transverse slots 18 extended from the upper wall of the longitudinal slots 15, and one or both slots 15 may also communicate with a second transverse slot 19, which extends from the lower wall of the longitudinal slot 15, for a purpose as will be described.

The side arms 10, 12 of the end-supporting devices $d$, $e$, may be pivoted at 20 to ears 21, which may be struck up from the lower member $a$ (see Fig. 2). The pins or projections 14 may be in the form of rivets, which are provided with heads 22 to prevent the upper member from becoming disengaged from the arms 10, 12, and yet allow the pins or projections 14 to travel in the slots 15.

From the above description, it will be seen, that the upper member $b$ may normally rest on the lower member $a$, as represented in Fig. 3, in which position the arms 10, 12 are in a position substantially parallel with the member $a$ and the pins 14 are located in the slots 15 near the center of the member b. In this condition, the device can be used as a support for the jack 23 of ordinary construction, when the latter is used under the front axle 24 of the car, which axle is at a lower level than the rear axle 25, which latter is represented in Fig. 7. When, however, it is desired to jack up the rear axle 25, the member b is elevated by turning the arms 10, 12, into the vertical position shown in Figs. 1 and 2, and the jack 23 is placed upon the upper member b, as represented in Fig. 7. The arms 10—12 are locked in their upright position by the pins 14 entering the slots 18, which prevent movement of the upper member with relation to the arms 10, 12, and serve to render the upper member and the said arms rigid or in fixed relation to the lower member, and avoid collapsing of the supporting device under load. After the necessary repair or change in the tire or shoe 26 has been made, the axle 25 is lowered until the wheel rests upon the ground, after which the jack 23 is removed, and the upper member b is lowered into its normal position, which is effected by the operator lifting the upper member until the pins 14 have been removed from the transverse slots 18, and the longitudinal slots 15 have been brought into line with the pins 14, which latter can then be moved in said longitudinal slots toward the center of the upper member, so as to permit the arms 10, 12, to be turned down into their normal or substantially horizontal position represented in Fig. 3. When the device is used as a support for the jack, it will be observed that the lower member a offers a bearing surface of substantial area for engagement with the ground, which is especially advantageous, in case it becomes necessary to jack up the car on a sandy road, or a road having a soft spot upon which the jack would otherwise have to rest.

The device is especially designed for use as a support for jacks, but it also can be advantageously used for other purposes, as, for instance, it can be used to chock the wheel of the car as represented in Fig. 4. When it is desired to so use the device, one end only of the upper member b is supported in its elevated position by the arms 10, 12, and in this case, the lower transverse slot 19 is used to receive the pin 14. The device is also useful in case one of the body springs 30 of the automobile should become broken. In this case, which is represented in Fig. 5, the device is inverted and inserted between the frame 31 of the car and the leaf-spring 30, with the flanges c of the member b straddling the leaf-spring 30. When thus used, the person driving the car, can proceed at a slow rate with safety to the occupants and to the car itself.

In some instances, it may occur that the front axle 23, in case of a blow-out or puncture, is brought so close to the ground as to prohibit the use of the jack under the axle. In such cases, the device can be used to advantage for engaging the front leaf spring 30, and the jack 24 can be placed under the bottom member a as represented in Fig. 6, and in order to keep the supporting device from slipping or moving with relation to the spring, means are provided for anchoring the device to the axle 24.

In the present instance, the member a has pivoted to it on opposite sides of the member b, levers or arms 40, which are designed to be projected beyond the end of the member a, so as to rest on the front axle 23, and arms 41 are pivoted to the levers 40, so as to engage the rear side of the axle. The levers 40 and arms 41 may be made of angle iron, and the arms 41 are pivoted to the levers 40 so as to have a fixed relation to the same, when the arms are in their operative position shown in Fig. 6, substantially at right angles to the lever 40. When the levers and arms are not in use, they are folded back upon the member a, as represented in Fig. 1.

In the present instance, I have shown one construction embodying the invention, but it is not desired to limit the invention to the construction shown. It may be preferred to make the device of sheet metal, preferably steel, but it is not desired to limit the invention in this respect.

In the device herein shown, it will be noticed that the supporting members are attached to both the upper and lower members a, b, and have a sliding engagement with one of the same.

Claims:

1. In a device of the character described, in combination, a lower member, an upper member having side flanges provided with longitudinally extended slots and with transverse slots communicating with said longitudinal slots near the opposite ends thereof, devices extended into and movable in said longitudinal slots, and supporting members carrying said devices and pivoted to the lower member and capable of being moved away from each other from a substantially horizontal position into a substantially vertical position, said supporting members having portions extended transversely of the upper member and upon which the bottom of the latter rests in its elevated position.

2. In a device of the character described, in combination, a lower member, an upper member comprising a bottom plate and side flanges extended upwardly from said bottom plate and provided with longitudinally extended slots and with transverse slots, supporting members for said upper member pivoted to the lower member and connected with said upper member in sliding engagement therewith through said longitudinal slots to attach the upper member to the lower member and to have their free ends moved away from each other when the upper member is elevated and toward each other when said upper member is lowered, said supporting members having portions extended transversely of the upper member and upon which the bottom of the latter rests in its elevated position.

3. In a device of the character described, in combination, a lower member, an upper member, supporting members for said upper member having side arms pivoted to the lower member and connected with said upper member in sliding engagement therewith to attach the upper member to the lower member and to have their free ends moved away from each other when the upper member is elevated and toward each other when said upper member is lowered and a back plate connecting said side arms and upon which the upper member rests in the elevated position of the latter, and means for locking said supporting members from turning on their pivots when said upper member is in its elevated position.

4. In a device of the character described, in combination, a lower member, an upper member, supporting members for said upper member pivoted to the lower member and connected with said upper member in sliding engagement therewith to attach the upper member to the lower member and to have their free ends moved away from each other when the upper member is elevated and toward each other when said upper member is lowered, and means connected with said lower member for anchoring the said lower member to the axle of an automobile.

5. In a device of the character described, in combination, a lower member, an upper member, a supporting member comprising side arms pivoted to the lower member and having a sliding engagement with the upper member to permit the latter to be inclined with relation to the lower member and a back plate connecting said side arms and upon which the upper member rests, and means for locking said upper member in its inclined position.

6. In a device of the character described, in combination, a lower member, an upper member comprising a bottom plate and side flanges extended upwardly from said bottom plate, supporting members for said upper member, said supporting members comprising side arms pivoted to one of said members and in sliding engagement with the other of said members to attach the latter to the former, and having their free ends movable toward each other to lower the upper member and away from each other to elevate said upper member and a back plate connecting said arms and upon which the upper member rests between the upper ends of said side arms.

7. In a device of the character described, in combination, a lower member, a sheet metal trough-shaped upper member comprising a bottom plate and side flanges extended longitudinally of said bottom plate and provided with longitudinally extended slots and with transverse slots communicating with said longitudinal slots, and sheet metal supporting members for said upper member and each comprising a back plate and side arms attached to said back plate and extended above the same to form ears, means for connecting said ears in sliding engagement with the upper member through the slots in the side flanges thereof, and means for pivoting the supporting member to the lower member.

In testimony whereof, I have signed my name to this specification in the presence of two subscribing witnesses.

JOHN G. GERRISH.

Witnesses:
JAS. H. CHURCHILL,
J. MURPHY.

Copies of this patent may be obtained for five cents each, by addressing the "Commissioner of Patents. Washington, D. C."